United States Patent Office 3,171,847
Patented Mar. 2, 1965

3,171,847
RENDERING PROCESS
Glenn A. Aikins, Chicago, Ill., assignor to Armour and Company, Chicago, Ill., a corporation of Delaware
No Drawing. Filed May 7, 1962, Ser. No. 192,977
4 Claims. (Cl. 260—412.6)

This invention relates to an improved process for the recovery of fat such as lard or edible tallow, from a mass of collagenous bearing animal fat.

In recent years there have been a number of major improvements in many types of rendering operations. However, there are certain rendering processes which have not been so improved. For example, in pressure rendering systems for recovering lard from mixed edible killing and cutting pork fat containing skin, present methods are very inefficient and time consuming. Further, the resulting lard product is not entirely satisfactory since it contains relatively high quantities of free fatty acids and often has undesirably low stability.

In the previous methods, the large pieces of killing and cutting pork fat were placed directly into pressure vessels and cooked under pressure by live steam. The mass was subjected to cooking for about 3½ to 4 hours and the tank was vented for about 1 hour. After venting, the cooked mass was allowed to settle for about 3 hours. Generally, the mass settled into about three distinct fractions or layers, the bottom layer being a mixture of water and water-soluble proteins, the middle layer being an emulsion of water, fat and protein solids, and the upper layer being the desired lard product. Each fraction is drawn off from the cooking tank and the lard is passed to a settling tank, where the lard is further clarified. Ordinarily, the lard stays in the settling tank for about 12 to 14 hours. It is seen that the material is held in the pressure vessel for about 7½ to 8 hours and in the settling tank for about 12 to 14 hours. Clearly, it would be very desirable to shorten the length of time for rendering lard by reducing the time in the pressure vessel and by eliminating the use of settling tanks. Also, a large amount of plant space would be made available for other purposes by reducing the required storage space for material waiting to be processed and also by eliminating the need for large settling tanks.

Accordingly, it is a principal object of this invention to substantially reduce the time required to render fat from a mixture of fat and skin. It is a further object of this invention to reduce the amount of plant space needed for processing a given quantity of lard. It is also an object of this invention to provide a process for improving the quality of lard by lowering the free fatty acid content and by increasing the stability of the final product. It is another object of this invention to substantially increase the yield of lard per hog. It is still another object of this invention to provide a semi-continuous wet-rendering process useful for recovering fat such as lard and edible tallow. Further purposes and objects of the present invention will appear as the specification proceeds.

It has now been discovered that the foregoing objects may be accomplished by first grinding the mass of animal fat and skin, applying dry heat to the ground mass, further heating the mass under steam pressure in order to render the fat, and finally clarifying the fat fraction by centrifugation.

The present process is useful for recovering fat and particularly lard. The starting material required for lard includes edible pork killing and cutting fat which may contain skin and little or no lean, the resulting lard product being edible. The process may also be used to recover edible tallow from edible beef or sheep fat.

The process is considered semi-continuous since the grinding step, the preheating step, and the final centrifuging step are all continuous, whereas the pressurized heating step is not continuous. It has been found to be advantageous to use the grinders, preheaters, and centrifuges in conjunction with a plurality of pressure cooking tanks in order to obtain maximum utilization of the continuous equipment.

In the grinding step, it is preferred that the mass of fat and skin be reduced to particles having a size of approximately ⅛ inch to ⅜ inch. It has been found that particles of about ⅛ inch in size are particularly advantageous. As any of a number of commercially available grinders may be used for this operation, it is believed that a detailed description of the equipment needed for this operation is unnecessary.

After the material has been ground or comminuted, it is passed into an open, steam jacketed kettle or tank which heats the product to a temperature ranging from about 150° F. to 212° F. It has been found to be highly satisfactory to heat the product to a temperature ranging from about 190° F. to 200° F. It is important that dry heat be used in this step rather than wet heat, since wet heat fails to provide a completely satisfactory product. In wet heating, the temperature of the material is raised by contact with live steam, whereas in dry heating, the heat is applied to the walls of a tank, which is open to the atmosphere. In order that the material be uniformly heated, it is helpful if there is agitation during heating.

Following this initial heating operation, the ground and heated material is passed into a conventional pressure rendering tank. In pressure rendering systems, the steam pressure in the tank usually ranges from about 40 p.s.i. to about 100 p.s.i. gauge, the upper pressure limit usually being dictated by limitations of available equipment. The temperature during the cooking step is determined by the temperature of the substantially saturated steam at the given pressure, and accordingly ordinarily ranges from about 285° F. to about 340° F.

The actual cooking time for the ground and preheated material is lowered to as little as about ½ hour, in contrast with the 3½ hours required to cook the product using the previous methods. Ordinarily, the cooking step in the present process takes about 45 minutes. After this time, the steam is turned off and the tank is allowed to settle for as little as 1 hour and ordinarily about 1¼ hours, while maintaining the same pressure in the tank. During the settling time, the various fractions of the material separate.

The greatly reduced time in the pressure vessel is accomplished by the preliminary grinding and heating steps. In the present process, a shorter time is required to heat small ground particles than was previously required to heat large pieces of fat. Further, by the grinding step, the loading capacity of each tank is increased by approximately 30%. Therefore, the grinding operation not only shortens the cooking time but it also increases the quantity of the product that may be loaded in each of the rendering tanks. Further, the initial heating step prepares the product for cooking since when the material is passed into the pressure cooker, it is at a raised temperature and a much shorter time is required to heat the product to the suitable rendering temperatures.

During the settling time, the material separates into three separate layers and each fraction or layer is separately drawn off and the fat layer is passed to a centrifuge. By centrifuging the fat fraction, impurities, such as water or fine solids still remaining in the fat, are removed. By centrifuging, it is unnecessary to hold the fat for an extended length of time in settling tanks. In this operation, any of a number of commercially available centrifuges may be used, although those developing relatively high centrifugal force are preferred. A particularly satisfactory centrifuge for this process would develop about 6000G (6000 times gravity).

The product resulting from this process has been found to be of unusually high quality. As previously mentioned it is important that the initial heat be dry heat to provide the highly clarified fat product produced by the present process. If wet heat is used for the first heating step, the lard has a hazy or cloudy appearance. The reason for this is not known, but apparently wet heat in the initial heating step adversely affects the mass of skin and fat, resulting in a less desirable final product. Surprisingly, by the use of a dry heat in the initial heating step, this undesirable result is avoided.

The lard product resulting from this improved process contains a substantially lower percentage of free fatty acids than was produced by previous methods. Generally, the amount of free fatty acid by using the present process ranges from about .20% to about .30% whereas in the previous methods, the quantity of free fatty acids ranged from about .35% to .42%. As to stability, by using standard tests such as the Active Oxygen Method (A.O.M.), it was found that the stability of the product produced by the present methods has a value of about 8 to 12 hours, whereas lard produced by previous methods has a stability of about 5 to 6 hours. Since it is well recognized that the quality of lard increases as the stability increases and as the quantity of free fatty acid decreases, it is seen that the product resulting from the present process is far superior to the product produced by previous methods.

Further, it has been found that the yield of lard per hog has been substantially increased by the present method. As an average, the yield of lard per hog by using the present method is increased by 2.4 lbs. which is approximately a 9% increase in the yield of lard per hog.

It can be seen from the above description of the present invention that all the objects previously set forth are accomplished by the described process. The present invention provides a semi-continuous method for rendering fat, including lard and edible tallow. Further, the capacity of the rendering tank is approximately doubled since an increased amount of material may be loaded into the pressure tanks and since material is processed much faster. Also, the quality of the lard is enhanced and there is a substantial increase in the yield of lard per hog. On a time basis, the time in the pressure vessel is reduced from almost 8 hours to as little as 2 hours, and the use of settling tanks, requiring 12 to 14 hours, has been eliminated entirely by the use of centrifuges. Further, by eliminating the settling tanks, additional floor space is made available for other operations and also less space is required for storing the raw product.

In one embodiment of the present invention, 15,050 lbs. of mixed edible hog cutting and killing fats were passed through a grinder, and heated to about 190° F. in an agitated steam jacketed tank which was open to the atmosphere. The material was then pumped to a pressurized rendering tank where it was heated by steam at 60 p.s.i.g. The cooking proceeded for about 45 minutes and the steam was turned off. The heated material was allowed to settle for about 1¼ hours under pressure of about 60 p.s.i. The tank water, emulsion layer and lard were separately drawn off. The lard was passed through a Titan centrifuge for clarification. 12,310 lbs. of lard were recovered. The lard analyzed as follows: FFA—0.23%, Color Red—1.0%, Moisture—0.12%, PV—.8%, Stability (A.O.M.)—10 hours, and the product was clear and brilliant.

Prior to making the above run, 15,310 lbs. of mixed edible hog cutting and killing fats were processed in a similar manner, except wet heat was used instead of dry heat in the initial heating step. 12,460 lbs. of lard were recovered and the product analyzed as follows: FFA—0.26%, Color Red—1.1%, Moisture—0.13%, PV—1.4%, Stability (A.O.M.)—5 hours, and the product was not clear and brilliant, containing 0.025% impurities. Therefore, it is seen that by practicing the present invention, a far superior product results.

While the foregoing sets forth a specific embodiment of the present invention, it is to be understood that such embodiment is not to be construed as a limitation of the scope of the invention.

I claim:

1. In a process for recovering fat from a mass of collagenous bearing animal fat, the steps of grinding said mass to particles ranging in size from about ⅛ inch to ⅜ inch, dry heating said ground mass to a temperature ranging from about 150° F. to 212° F., heating said mass under pressures of at least 40 p.s.i.g. by means of direct contact with steam, and centrifuging the fat fraction of said mass to remove the impurities and recover the clarified fat.

2. In a process for recovering fat from a mass of collagenous bearing animal fat, the steps of grinding said mass to particles ranging from about ⅛ inch to ⅜ inch, applying dry heat to said mass until a temperature of about 190 to 200° F. is reached, further heating said mass under pressure ranging from about 40 p.s.i.g. to 100 p.s.i.g. by means of direct contact with substantially saturated steam, and clarifying the fat fraction by centrifugation.

3. In a process for recovering fat from a mass of collagenous bearing animal fat, the steps of grinding said mass, to particles ranging in size from about ⅛ inch to ⅜ inch, dry heating said ground mass to a temperature ranging from about 150° F. to 212° F., further heating said mass under pressure by direct contact with substantially saturated steam at a temperature of at least 285° F. to render the fat, and clarifying the fat by centrifugation.

4. In a process for recovering fat from a mass of collagenous bearing animal fat, the steps of grinding said mass to particles ranging in size from about ⅛ inch to ⅜ inch, dry heating said ground mass to a temperature ranging from about 190 to 200° F., further heating said mass at temperatures ranging from about 285 to 340° F. and under pressures ranging from about 40 p.s.i.g. to 100 p.s.i.g by direct contact with steam for at least one-half hour, allowing said mass to fractionate for at least one hour, and clarifying the fat fraction by centrifugation.

References Cited in the file of this patent

UNITED STATES PATENTS

| | | |
|---|---|---|
| 1,654,506 | McTavish | Dec. 27, 1927 |
| 2,748,152 | Sifferd et al. | May 29, 1956 |
| 3,020,160 | Downing et al. | Feb. 6, 1962 |